(12) United States Patent
Pripstein et al.

(10) Patent No.: US 12,205,063 B2
(45) Date of Patent: *Jan. 21, 2025

(54) INTELLIGENT PREDICTION SYSTEMS AND METHODS FOR CONVERSATIONAL OUTCOME MODELING FRAMEWORKS FOR SALES PREDICTIONS

(71) Applicant: Allstate Insurance Company, Northbrook, IL (US)

(72) Inventors: Eric Pripstein, Northbrook, IL (US); Garrett Fiddler, Northbrook, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/491,969

(22) Filed: Oct. 23, 2023

(65) Prior Publication Data

US 2024/0273447 A1 Aug. 15, 2024

Related U.S. Application Data

(63) Continuation of application No. 16/927,321, filed on Jul. 13, 2020, now Pat. No. 11,829,920.

(51) Int. Cl.
*G06Q 10/0639* (2023.01)
*G06F 17/18* (2006.01)
(Continued)

(52) U.S. Cl.
CPC ....... *G06Q 10/06398* (2013.01); *G06F 17/18* (2013.01); *G06Q 30/0202* (2013.01);
(Continued)

(58) Field of Classification Search
None
See application file for complete search history.

(56) References Cited

U.S. PATENT DOCUMENTS

2014/0025376 A1\* 1/2014 Wasserblat .............. G10L 25/51
704/238
2015/0142446 A1 5/2015 Gopinathan et al.
(Continued)

FOREIGN PATENT DOCUMENTS

CN 108962229 A \* 12/2018 ........... G06K 9/6223
JP 2983159 B2 \* 11/1999
(Continued)

OTHER PUBLICATIONS

Z. Peng, W. Wang, B. Balducci, D. Marinova and Y. Shang, "Toward Predicting Communication Effectiveness," 2018 IEEE Third International Conference on Data Science in Cyberspace (DSC), 2018, pp. 76-83, doi: 10.1109/DSC.2018.00020 (Year: 2018).\*
(Continued)

*Primary Examiner* — Mehmet Yesildag
(74) *Attorney, Agent, or Firm* — Dinsmore & Shohl LLP

(57) ABSTRACT

An intelligent prediction system includes one or more processors, one or more memory components, and machine-readable instructions that cause the intelligent prediction system to: receive text data comprising a plurality of speaker turn segments of a transcription of a conversation, each speaker turn segment of the plurality of speaker turn segments representative of a turn in the conversation, the plurality of speaker turn segments collectively representative of the conversation up to a point of time, generate a point in time bind probability based on a speaker turn segment bind probability of a speaker turn segment at the point in time and memory data associated with the plurality of segments up to the point in time, and generate a speaker turn segment impact score at the point in time by subtracting an immediately preceding point in time bind probability from the point in time bind probability.

16 Claims, 6 Drawing Sheets

(51) Int. Cl.
*G06Q 30/0202* (2023.01)
*G10L 15/06* (2013.01)
*G10L 15/16* (2006.01)
*G10L 15/26* (2006.01)

(52) U.S. Cl.
CPC ............ *G10L 15/063* (2013.01); *G10L 15/16* (2013.01); *G10L 15/26* (2013.01)

(56) References Cited

U.S. PATENT DOCUMENTS

| | | |
|---|---|---|
| 2016/0316059 A1* | 10/2016 | Nuta .................. G06N 7/01 |
| 2016/0352907 A1 | 12/2016 | Raanani et al. |
| 2019/0318743 A1 | 10/2019 | Reshef et al. |
| 2019/0362737 A1 | 11/2019 | Feinauer et al. |
| 2019/0371309 A1 | 12/2019 | Lema |
| 2020/0160356 A1* | 5/2020 | McCord .................. G10L 15/22 |

FOREIGN PATENT DOCUMENTS

| | | |
|---|---|---|
| JP | 661603 B1 | 11/2019 |
| WO | 2014130748 A1 | 8/2014 |
| WO | 2018209254 A1 | 11/2018 |

OTHER PUBLICATIONS

International Search Report and Written Opinion for PCT Appln. No. PCT/US21/41242 dated Oct. 20, 2021, 19 pages.
Supplementary European Search Report for Appln. No. 21842785.4, dated May 31, 2024, 14 pages.

* cited by examiner

INTELLIGENT PREDICTION SYSTEMS AND METHODS FOR CONVERSATIONAL OUTCOME MODELING FRAMEWORKS FOR SALES PREDICTIONS

CROSS-REFERENCE TO RELATED APPLICATIONS

This application is a continuation of U.S. patent application Ser. No. 16/927,321, filed Jul. 13, 2020, and entitled "INTELLIGENT PREDICTION SYSTEMS AND METHODS FOR CONVERSATIONAL OUTCOME MODELING FRAMEWORKS FOR SALES PREDICTIONS," which are incorporated herein by reference in their entirety.

TECHNICAL FIELD

The present specification generally relates to intelligent prediction systems and methods and, more specifically, intelligent prediction systems and methods for conversational outcome modeling frameworks to predict the likelihood of a sale in a sales conversation such as in a sales call.

BACKGROUND

Customer services representatives may attempt to sell a product and/or service through virtual signal recordable conversations such as text-based (e.g., text-messaging, email, etc.) and/or telephonic conversations. For example, insurance companies or other businesses may utilize human sales representatives to sell policies, services, or other goods. Natural language models may be employed to guide virtually engaging users to appropriate personnel and/or to generate a natural language output of the virtual signal recordable conversation such as an amount of times a particular word was used in the conversation. However, it may be difficult to determine an impact of any type of sale strategy used in the course of the conversation.

SUMMARY

Embodiments of the present disclosure are directed to intelligent prediction systems and methods that predict the likelihood that a conversation will have a desired outcome (e.g., result in a binding sale indicative of a successful sale attempt) and provide the impact of each individual turn of the conversation at a point in time relative to the desired outcome and based on the overall conversation to the point in time. Accordingly, outputs of the intelligent prediction systems and methods described herein may allow customer service representatives to determine sale strategies based on analyzed conversations that aid in directing a conversation to a successful result of a binding sale.

For example, according to an embodiment of the present disclosure, an intelligent prediction system may include one or more processors, one or more memory components communicatively coupled to the one or more processors, and machine-readable instructions stored in the one or more memory components. The machine-readable instructions cause the intelligent prediction system to perform at least the following when executed by the one or more processors: receive text data comprising a plurality of speaker turn segments of a transcription of a conversation between two or more individuals regarding a sale offer, each speaker turn segment of the plurality of speaker turn segments of the transcription representative of a turn in the conversation defined by associated with speech data of one of the two or more individuals, the plurality of speaker turn segments collectively representative of the conversation up to a point of time; vectorize each speaker turn segment of the text data to assign an associated numerical value to each speaker turn segment; generate, via a neural network prediction model, a point in time a bind probability representative of a likelihood of a successful outcome of the sale offer at the point in time based on (i) a speaker turn bind probability of a speaker turn segment at the point in time and (ii) memory data associated with the plurality of speaker turn segments up to the point in time; and generate, via the neural network prediction model, a speaker turn segment impact score at the point in time by subtracting an immediately preceding point in time bind probability from the point in time bind probability.

According to another embodiment of the present disclosure, an intelligent prediction system may include one or more processors, one or more memory components communicatively coupled to the one or more processors, and machine-readable instructions stored in the one or more memory components. The machine-readable instructions cause the intelligent prediction system to perform at least the following when executed by the one or more processors: receive text data comprising a plurality of speaker turn segments of a transcription of a conversation between two or more individuals regarding a sale offer, each speaker turn segment of the plurality of speaker turn segments of the transcription representative of a turn in the conversation associated with speech data of one of the two or more individuals, the plurality of speaker turn segments collectively representative of the conversation up to a point of time; vectorize each speaker turn segment of the text data to assign an associated numerical value to each speaker turn segment; apply a loss function configured to minimize error to each speaker turn segment post vectorization; generate, via a neural network prediction model, a point in time bind probability representative of a likelihood of the successful outcome of the sale offer at the point in time based on (i) a speaker turn segment bind probability for each speaker turn segment at the point in time and (ii) memory data associated with the plurality of speaker turn segments up to the point in time; and generate, via the neural network prediction model, a speaker turn segment impact score at the point in time by subtracting an immediately preceding point in time bind probability from the point in time bind probability.

In yet another embodiment, a method of conversational outcome prediction using an intelligent prediction system may include receiving, with one or more processors of the intelligent prediction system, text data comprising a plurality of speaker turn segments of a transcription of a conversation between two or more individuals regarding a sale offer, each speaker turn segment of the plurality of speaker turn segments of the transcription representative of a turn in the conversation associated with speech data of one of the two or more individuals, the plurality of speaker turn segments collectively representative of the conversation up to a point of time; vectorizing, with the one or more processors, each speaker turn segment of the text data to assign an associated numerical value to each speaker turn segment, generating, with a neural network prediction module; generating, via a neural network prediction model, a point in time bind probability representative of a likelihood of the successful outcome of the sale offer at the point in time based on (i) a speaker turn segment bind probability at the point in time and (ii) memory data associated with the plurality of speaker turn segments up to the point in time; and generating, via the neural network prediction model, a speaker turn segment impact score at the point in time by subtracting an immediately preceding point in time bind probability from the point in time bind probability.

Although the concepts of the present disclosure are described herein with primary reference to insurance sales, it is contemplated that the concepts will enjoy applicability to any setting for purposes of intelligent prediction solutions, such as alternative business settings or otherwise, including and not limited to, non-insurance related sales (e.g., other service and/or product sales), such as through telephonic, web-based, and/or other voice-based transmission technologies.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

In embodiments described herein, an intelligent prediction module is configured to implement systems and methods to generate automated predicted bind outcomes of a conversation, as described in greater detail below. Customer service representatives (e.g., sales associates) may make and bind sales through interactions with customers. These interactions may take place in person, over the phone, over internet communications (e.g., chat-based applications, email, etc.), or with similar virtual signal recordable communication technologies. In one or more embodiments described herein, the conversation between the representative and the customer may be recorded and received into an intelligent prediction module to output a bind probability (e.g., the probability of making a sale, coming to agreement, or other successful outcome) throughout the conversation. In a hybrid segment-to-segment and many-to-one processing, the intelligent prediction module determines a segment-by-segment (i.e., turn-by-turn) impact to bind probability at a point in time associated with a segment and a point in time bind probability of collective segments in a conversation up the point in time.

Accordingly, systems and methods as provided herein allow a user to determine how a conversation is progressing and the impact to bind probability of each turn in the conversation. By generating a bind probability that takes into account the individual impact of each turn in a conversation and the overall conversation, the bind probability data may allow a user to more readily understand how a conversation is progressing and the likelihood at any point of the conversation that a sale (or other desired outcome) will be achieved. In embodiments, systems and methods as described herein may also allow users to identify strategies and/or techniques to increase bind probability, identify training initiatives for training a customer service representative to make better sales calls, and/or recognize and/or alert users of opportunities to try different sale strategies. These and additional features will be described in greater detail below.

As used herein, and as noted above, "bind probability" refers to the probability of a conversation resulting in a successful outcome. Successful outcomes may include, but are not limited to, making a sale (i.e., achieving a sales agreement), coming to another type of agreement, or achieving some other desired conversational outcome result.

Figure 1:
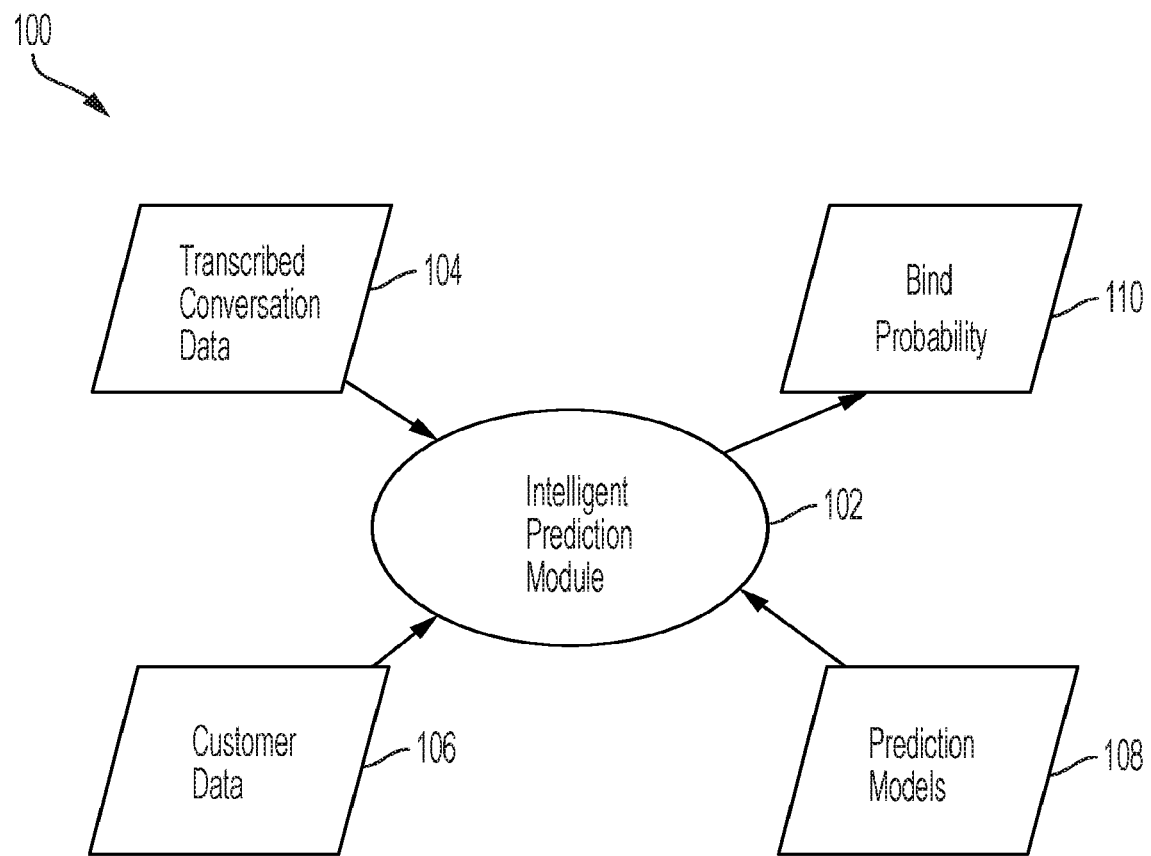
FIG. 1 depicts an intelligent prediction solution including an intelligent prediction module employing one or more prediction models to generate predictive bind probabilities, according to one or more embodiments shown and described herein.

Referring now to FIG. 1, an intelligent prediction solution 100 utilizes an intelligent prediction module 102 that automatically generates bind probability outputs based on processing transcribed conversation data 104 and/or stored customer data 106. As a non-limiting embodiment, the transcribed conversation data 104 includes text data having a plurality of segments of a transcription of a conversation between two or more individuals. The two or more individuals may be a customer service representative and a customer. Such conversations may be entered into with the goal of making a sale, retaining a client, coming to an agreement, or any other purpose to which there may be a desired conversational outcome result.

Each speaker turn segment of the plurality of speaker turn segments of the transcription is representative of a turn in the conversation associated with speech data of one of the two or more individuals. The plurality of speaker turn segments collectively represent the conversation up to a point of time. The point in time may be, for example, the end of the conversation or some intermediate time between a beginning and the end of the conversation. That is, each speaker turn segment may be directed to and include a single speaker's turn in the conversation as one individual of the individuals participating in the conversation. By way of example, and not as a limitation, a customer may start a conversation by saying "Hi, I would like to talk to a customer service representative," thereby providing the first turn. The next turn in the conversation might be a reply from the customer service representative (e.g., "Hi, this is Sam, how can I assist you?"), to which the customer may reply, and so on and so forth switching back and forth between speaking turns (e.g., segments) of the customer and the customer service representative.

In some embodiments, stored customer data 106, may include any information known about the customer from one or more customer information sources (e.g., inputs provided by a customer, information stored on a remote server, local memory, or the like). For example, a call with a pre-existing customer (e.g., a customer already having an insurance policy with the company) may include information such as, but not limited to, age, gender, existing policies, address, purpose of call, credit score, etc. Information of a new customer may include a purpose of the call (e.g., as provided through user selections from a menu), or other apparent information, e.g., area code of calling number, IP address where conversing through a web-based platform, etc. As will be described in greater detail herein, the customer data 106 may be used to generate a starting bind probability. The bind probability may thereafter rise or fall from the starting bind probability. As used herein, the phrase "starting bind probability" refers to the likelihood of a successful outcome based on the stored information prior to or at the start of the conversation. For example, a customer calling to buy insurance would receive a greater starting bind probability than a customer calling to cancel a service.

One or more models 108 may be trained on a training sets to generate bind probability predictions and may be used to generate the bind probability prediction of a conversation. In embodiments, the one or more models 108 include neural network prediction models configured to generate predictive bind probabilities, flagger models configured to provide a location of specific events of interest, and/or prior bind probability models configured to provide a starting bind probability for each conversation based on pre-stored customer information. A training module 212A (schematically illustrated in FIG. 2), as described herein and in greater detail further below is configured to train such a model 108 using one or more pre-stored conversation training sets. Such training sets, may include real conversations recorded and/or transcribed conversations from previous sale interactions between individuals, which conversations may include indicators providing speaker attribution, a binary result of accomplishing the goal of the call (e.g., making a binding sale) or failing to accomplish the goal, and the like. Such data sets of pre-stored conversations may be stored on a memory component 206, a database, and/or within a remote server 214. As a non-limiting example, the stored conversations may be utilized to train one or more neural network models, such as a bind probability model and/or a flag event identification model.

In some embodiments, synthetic or staged conversation data may be used for training the one or more models 108. With reference to the use of training or trained herein, it is to be understood that, in an embodiment, a model object is trained or configured to be trained and used for data analytics as described herein and includes a collection of training data sets based on pre-stored conversation transcripts placed within the model object. The intelligent prediction module 102 may apply the one or more trained models 108 to the transcribed conversation data 104 to generate a point in time bind probability at any point of time in the conversation, as described in greater detail further below. In embodiments, the intelligent prediction module 102 may further apply the one or more trained models 108 to identify flag events as will be described in greater detail herein and/or to generate a starting bind probability for each conversation based on pre-stored customer information.

The intelligent prediction module 102 may be communicatively coupled to a "big data" environment including a database configured to store and process large volumes of data in such an environment. The database may be, for example, a structured query language (SQL) database or a like database that may be associated with a relational database management system (RDBMS) and/or an object-relational database management system (ORDBMS). The database may be any other large-scale storage and retrieval mechanism including, but not limited to, a SQL, SQL including, or a non-SQL database. For example, the database may utilize one or more big data storage computer architecture solutions. Such big data storage solutions may support large data sets in a hyperscale and/or distributed computing environment, which may, for example, include a variety of servers 214 utilizing direct-attached storage (DAS). Such database environments may include Hadoop, NoSQL, and Cassandra that may be usable as analytics engines. Thus, while SQL may be referenced herein as an example database, it is understood that any other type of database capable of supporting large amounts of data, whether currently available or yet-to-be developed, and as understood to those of ordinary skill in the art, may be utilized.

Figure 2:
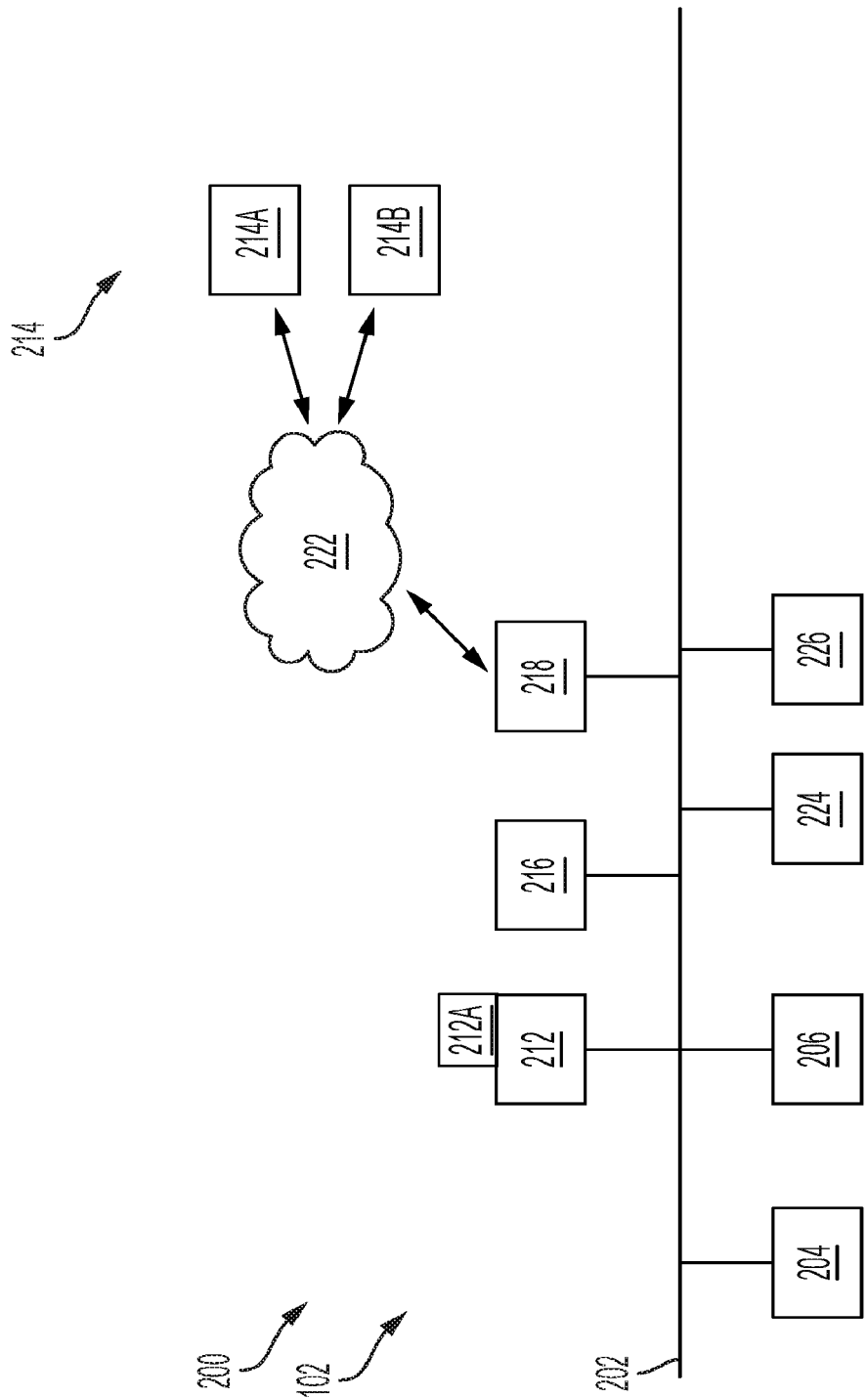
FIG. 2 illustrates a computer implemented intelligent prediction system including the intelligent prediction module of FIG. 1 for use in the process flows described herein, according to one or more embodiments shown and described herein.

FIG. 2 illustrates a computer implemented intelligent prediction system 200 for use with the processes described herein, such as process 300 of FIG. 3 described in greater detail below. Referring to FIG. 2, a non-transitory, intelligent prediction system 200 is configured for implementing a computer and software-based method, such as directed by the intelligent prediction solution 100 and the processes described herein, to automatically generate bind probability outputs. The intelligent prediction system 200 includes the intelligent prediction module 102 of FIG. 1 to generate the automated bind probability determinations 110. The intelligent prediction system 200 further includes a communication path 202, one or more processors 204, a non-transitory memory component 206, a text analytics module 212, a training module 212A of the text analytics module 212, a machine-learning module 216, a network interface hardware 218, network 222, one or more remote servers 214 (e.g., a customer information server 214A, a training data server 214B, or the like), a display 224, and an audio capture module 226. It is noted that systems according to the present disclosure may include a greater or fewer number of modules without departing from the scope of the present disclosure. The lines depicted in FIG. 2 indicate communication rather than physical connection between the various components.

As noted above, the intelligent prediction system 200 comprises the communication path 202. The communication path 202 may be formed from any medium that is capable of transmitting a signal such as, for example, conductive wires, conductive traces, optical waveguides, or the like, or from a combination of mediums capable of transmitting signals. The communication path 202 communicatively couples the various components of the intelligent prediction system 200. As used herein, the term "communicatively coupled" means that coupled components are capable of exchanging data signals with one another such as, for example, electrical signals via conductive medium, electromagnetic signals via air, optical signals via optical waveguides, and the like. Accordingly, communication may be facilitated through wired and/or wireless transmissions of data signals.

The intelligent prediction system 200 of FIG. 2 also comprises the processor 204. The processor 204 can be any device capable of executing machine-readable instructions. Accordingly, the processor 204 may be a controller, an integrated circuit, a microchip, a computer, or any other computing device. The processor 204 is communicatively coupled to the other components of the intelligent prediction system 200 by the communication path 202. Accordingly, the communication path 202 may communicatively couple any number of processors 204 with one another, and allow the modules coupled to the communication path 202 to operate in a distributed computing environment. Specifically, each of the modules can operate as a node that may send and/or receive data.

The illustrated system 200 further comprises the memory component 206, which is coupled to the communication path 202 and communicatively coupled to the processor 204. The memory component 206 may be a non-transitory computer readable medium or non-transitory computer readable memory and may be configured as a nonvolatile computer readable medium. The memory component 206 may include RAM, ROM, flash memories, hard drives, or any device capable of storing machine-readable instructions such that the machine-readable instructions can be accessed and executed by the processor 204. The machine-readable instructions may include logic or algorithm(s) written in any programming language such as, for example, machine language that may be directly executed by the processor 204, or assembly language, object-oriented programming (OOP), scripting languages, microcode, etc., that may be compiled or assembled into machine-readable instructions and stored on the memory component 206. Alternatively, the machine-readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in computer programming languages, as pre-programmed hardware elements, or as a combination of hardware and software components.

The intelligent prediction system 200 may include the text analytics module 212 and the machine-learning module 216, as described above, communicatively coupled to the one or more processors 204. The text analytics module 212 is configured to at least apply data analytics and artificial intelligence algorithms and models to received text, audio, and/or visual data of a conversation. The machine-learning module 216 is configured for providing such artificial intelligence algorithms and models, such as to the text analytics module 212. The machine-learning module 216 may include an artificial intelligence component to train and provide machine-learning capabilities to a neural network as described herein.

By way of example, and not as a limitation, a recurrent neural network (RNN), such as a unidirectional Gated Recurrent Unit (GRU). The GRU may be utilized with an attached time distributed sigmoid layer and/or other activation function such as a linear function, a step function, another logistic (sigmoid) function, a tanh function, or a rectified linear unit (ReLu) function. Other RNN architecture is within the scope of this disclosure, such as Long Short-Term Memory (LSTM), other GRU applications, or a standard RNN. Other artificial neural networks are further contemplated in addition to or alternative the intelligent prediction systems and methods described herein, such as convolutional neural networks (CNN) and the like as understood to those skilled in the art.

In embodiments, a GRU may allow for each speaker turn segment of a conversation to be analyzed against memory data associated with a plurality of speaker turn segments prior to comparing adjacent segments to determine a speaker turn segment impact score. The GRU may provide memory of previously analyzed segments of the conversation to inform the impact of the current segment on the overall conversation to generate the speaker turn segment impact score for the current segment compared to an immediately preceding segment. Accordingly, in a hybrid segment-to-segment (e.g., sequence-to-sequence) and many-to-one processing, a bind probability of the overall conversation may be provided, and the individual impact of each turn in the conversation may be realized. A time distributed sigmoid layer applied to the GRU may limit output impact scores/bind probabilities to be between 0 and 1 such that outputs provide a percentage impact on binary result of a bind or no bind outcome (e.g., sale or no sale).

The text analytics module 212 may include a training module 212A which may process training data sets of pre-stored conversations to train one or more models 108, through some of which transcribed conversation data 104 may be fed for prediction of bind probability. In embodiments, the prior bind probability models may not utilize the transcribed conversation data 104 while the event-flagging models and predictive bind models described herein utilize the transcribed conversation data 104. Training data sets stored and manipulated in the intelligent prediction system 200 as described herein may be utilized by the machine-learning module 216, which is able to leverage, for example, a cloud computing-based network configuration to apply Machine Learning and Artificial Intelligence. This machine learning application may create models that can be applied by the intelligent prediction system 200, to make it more efficient and intelligent in execution. As an example and not a limitation, the machine-learning module 216 may include artificial intelligence components selected from the group consisting of an artificial intelligence engine, Bayesian inference engine, and a decision-making engine, and may have an adaptive learning engine further comprising a deep neural network-learning engine. It is contemplated and within the scope of this disclosure that the term "deep" with respect to the deep neural network-learning engine is a term of art readily understood by one of ordinary skill in the art.

As described above, data sets including pre-stored transcribed conversation data, may be used for training the one or more models 108. Such conversation data training sets, may include, for example, conversations recorded and/or transcribed from previous sale interactions between individuals such as a customer representative and a customer(s) including, but not limited to, indicators providing speaker attribution, the binary result of accomplishing the goal of the call (e.g., a sale) or not, and the like. Such conversations training data set may be stored on the memory component 206, a database, and/or within a remote server 214. As a non-limiting example, the real conversations may be utilized to train one or more neural network models 108, such as a bind probability model and/or a flag event identification model. In some embodiments, synthetic or staged conversation data may be used for training the one or more models 108.

To prepare the conversation training sets, the text analytics module 212 may receive the transcribed conversation data 104 of the one or more training data sets and filter the conversations for length, quality etc. In embodiments, a padding function may be applied to each segment such that each segment comprises an equivalent segment length. As a non-limiting example, zeros may be added to each segment vector to adjust each segment vector to the equivalent segment length.

In some embodiments, each segment of the conversation may be vectorized, such as through using a document-to-vector algorithm, to assign an associated numerical value to each segment. In some embodiments, longer segments may be subdivided into a smaller turn fragments. In such embodiments, each of the smaller turn fragments may also be vectorized. If needed, each conversation training set may further be padded with additional zero vectors to ensure each data training set has the same number of conversation segments. Further, applying a loss function, post vectorization, may include applying a weight adjustment to achieve a weight adjustment value. The loss function may include adjusting each segment such as a manipulation of each segment vector based on the weight adjustment to achieve the weight adjustment value. Each segment may be adjusted to have the same weight.

As noted above, the one or more trained model 108 may be trained to output a point in time bind probability representative of a likelihood of a successful outcome of the sale offer at the point in time. The likelihood may be based on (i) a speaker turn segment bind probability of a speaker turn segment at the point in time and (ii) memory data associate with the plurality of speaker turn segments up to the point in time. A speaker turn segment impact score at the point in time may be generated by subtracting an immediately preceding point in time bind probability from the point in time bind probability. Thus, the bind probability may be determined at any point in the conversation, and segments of conversation may be identified that were particularly effective or ineffective.

In some embodiments, the one or more trained models 108 may be configured to allow for identification of one or more flag events. Flag events may refer to various pre-known conversation techniques (e.g., sale strategies). For example, the text analytics module 212 may include a natural language processor to detect keywords or phrases (e.g., via clustering or keyword searches) to identify particular flag events (e.g., an offer for sale, an offer of a discount, discussion of available discounts, mention of a competitor, customer intentions, premiums, or the like. In embodiments, the one or more models 108 may be trained to identify a location of events and/or to generate an impact of flagged events. As a non-limiting example, the one or more models 108 may be trained to estimate an impact of each type of flag event based on the transcribed conversation data 104. For example, during training of the model 108, the average impact of each segment in which a type of flag event appears may be averaged together to assess a positive or negative impact of a particular type of flag event. In embodiments, a plurality of conversations as transcribed conversation data 104 may be input into some embodiments of the one or more models 108, one or more speaker turn segments representative of turns across all the input conversation that contain a flagged event may be output as segment impacts, and the output segment impacts may be averaged to generate the impact of flagged events across conversations.

Still referring to FIG. 2, the intelligent prediction system 200 comprises the network interface hardware 218 for communicatively coupling the intelligent prediction system 200 with a computer network such as network 222. The network interface hardware 218 is coupled to the communication path 202 such that the communication path 202 communicatively couples the network interface hardware 218 to other modules of the intelligent prediction system 200. The network interface hardware 218 can be any device capable of transmitting and/or receiving data via a wireless network. Accordingly, the network interface hardware 218 can include a communication transceiver for sending and/or receiving data according to any wireless communication standard. For example, the network interface hardware 218 can include a chipset (e.g., antenna, processors 204, machine readable instructions, etc.) to communicate over wired and/or wireless computer networks such as, for example, wireless fidelity (Wi-Fi), WiMax, Bluetooth, IrDA, Wireless USB, Z-Wave, ZigBee, or the like.

The network 222 can include any wired and/or wireless network such as, for example, wide area networks, metropolitan area networks, the internet, an intranet, satellite networks, or the like. Accordingly, the network 222 can be utilized as an access point by the intelligent prediction system 200 to access one or more servers 214 (e.g., a customer information server 214A, a training data server 214B, or the like). The one or more servers 214 may generally comprise processors, memory, and chipset for delivering resources via the network 222. Resources can include providing, for example, processing, storage, software, and information from the one or more servers 214 to the intelligent prediction system 200 via the network 222. Additionally, it is noted that the one or more servers 214 and any additional servers 214 can share resources with one another over the network 222 such as, for example, via the wired portion of the network 222, the wireless portion of the network 222, or combinations thereof.

The customer information server 214A may include, for example, the customer data 106 regarding pre-existing customer information. Customer information may include any available and/or stored customer data such as, for example, but not limited to, age, gender, existing policies, address(es), purpose of call, children, credit report, credit inquiries, or any other available information. Information of a new customer may include such information as purpose of call (e.g., as provided through user selections from a menu), publically available information, or other apparent information, e.g., area code of calling number, IP address, etc. As noted above, the one or more processors 204 may execute logic stored on the memory component 206 to determine, based on the customer data 106, a starting bind probability. A starting bind probability may include a numeric value, based on the culmination of customer data 106. For example, a customer known to be calling to make a purchase (e.g., of an insurance policy) may have be assigned a positive score or adjustment (e.g., somewhere between zero to indicate no sale and one to indicate a sale) prior to any interaction with a customer service representative. Additional available and/or stored information may adjust or reduce the starting bind probability.

It is noted that in embodiments where customer information is not available, in lieu of using customer information, and/or in addition to stored customer information, a starting bind probability may be based on the average conversational outcome (bind or no bind), an average conversational outcome for the particular customer service representative, an average conversational outcome for a particular region, or other similar conversational outcome oriented parameters. For example, 30% of sale conversations (e.g., over phone and/or over text) may result in a sale. Accordingly, the starting bind probability may be set at 0.3. Thereafter, bind probability may be adjusted up or down as the conversation progresses.

The training data server 214B may store historical sales conversation transcripts, which may be used to train and/or update the model 108 to identify patterns indicative of increasing and/or decreasing bind probability. For example, and as described in more detail above, to train a model 108, the historical sales conversation transcripts may be provided to the training module 212A.

Figure 4:
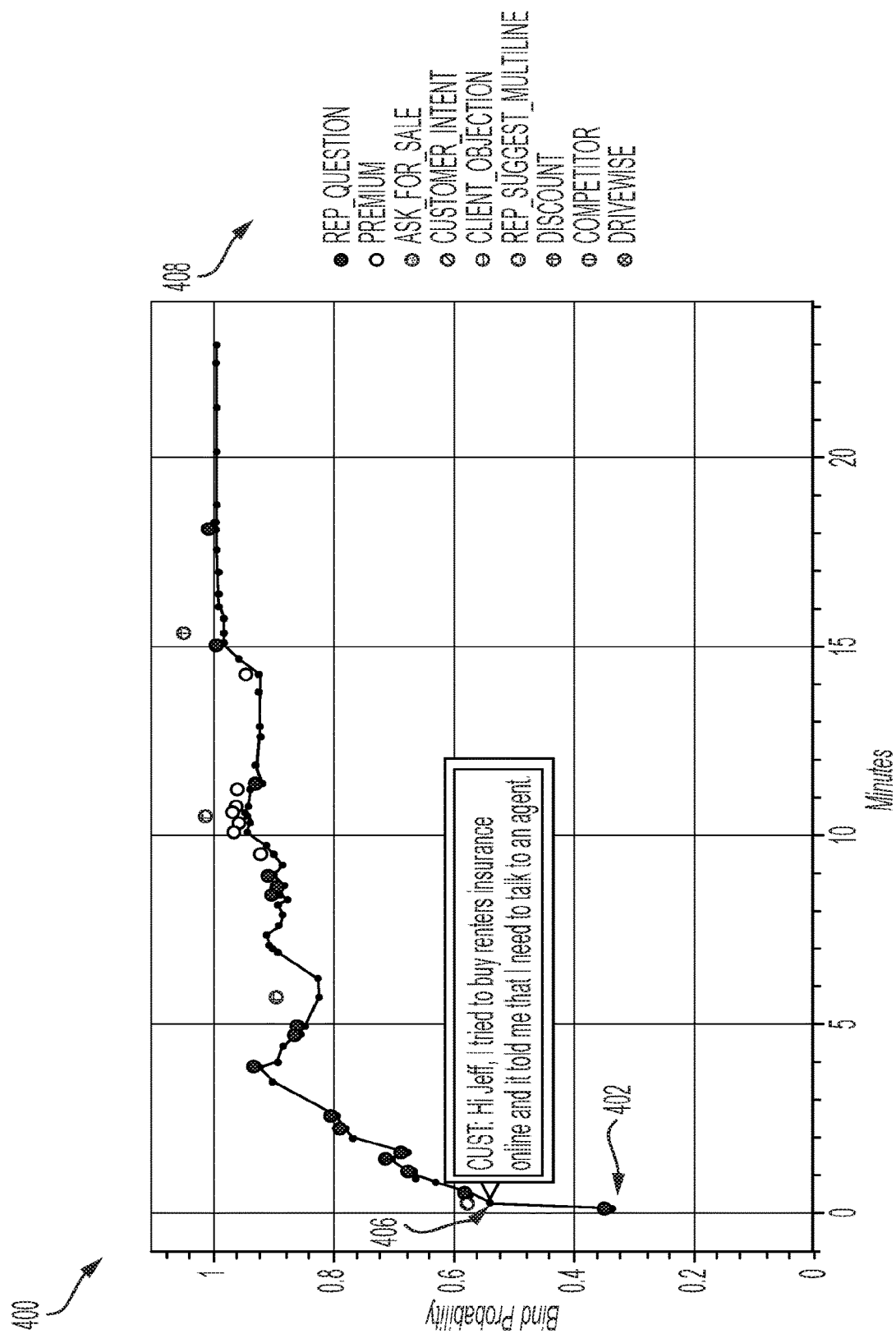
FIG. 4 depicts a graphical display of an average bind probability throughout a conversation, according to one or more embodiments shown and described herein.

Still referring to FIG. 2, as noted above, the intelligent prediction system 200 may include the display 224 for providing visual output such as, for example, information, graphical reports, messages, or a combination thereof. The display 224 is coupled to the communication path 202 and communicatively coupled to the processor 204. Accordingly, the communication path 202 communicatively couples the display 224 to other modules of the intelligent prediction system 200. The display 224 can comprise any medium capable of transmitting an optical output such as, for example, a cathode ray tube, light emitting diodes, a liquid crystal display, a plasma display, or the like. As will be described in greater detail below the display 224 may be caused to display one or more graphical depictions of bind probability over time of a conversation (e.g., as illustrated in FIG. 4). Accordingly, because bind probability is observed over time, with changes in bind probability shown at each segment in the conversation, a likelihood of an outcome of the conversation may be determined and/or areas may be identified that improved or reduced bind probability.

In some embodiments, an audio capture module 226 may be communicatively coupled to the one or more processors 204 over the communication path 202. The audio capture module 226 may comprise any device configured to record audible data (e.g., a recorder) to capture a verbal conversation between two or more participants. In some embodiments, the audio capture module 226 may record telephonic conversations between a customer service representative and a customer. The one or more processors 204, with the audio capture module 226, may execute machine-readable instructions to transcribe audio data into transcribed conversation data 104, with speaker attributions, which may then be analyzed for bind probability. In some embodiments, the system 200 may capture, transcribe, and analyze a conversation in real time to provide feedback to a user as to the bind probability of the conversation.

Figure 3:
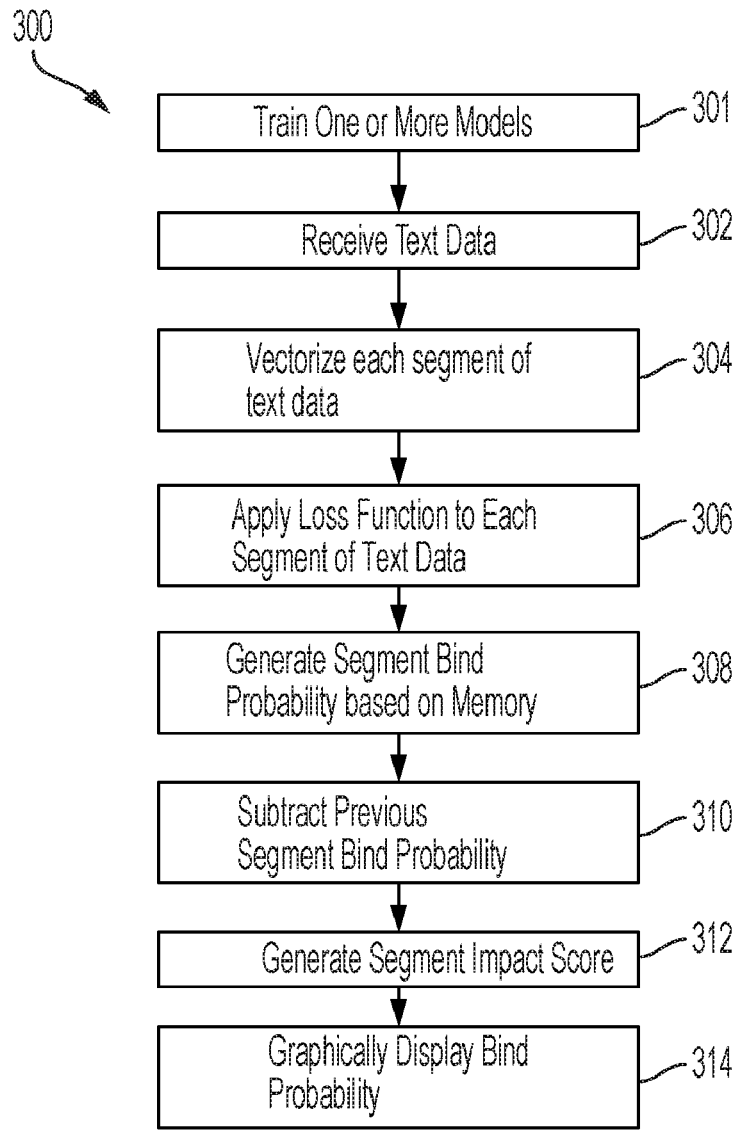
FIG. 3 depicts a flowchart process for use of the intelligent prediction solution of FIG. 1 and the intelligent prediction system of FIG. 2, according to one or more embodiments shown and described herein.

Referring to FIG. 3, a process 300 is shown for use with the training module 212A and the text analytics module 212 of the intelligent prediction system 200 of FIG. 2 to predict bind probabilities based on textual analysis. It is noted that a greater or fewer number of steps may be included without departing from the scope of the present disclosure.

For example, in some embodiments, the method may include, at block 301, training the neural network prediction model 108 based on a plurality of data sets of pre-stored conversations (e.g., stored on the training data server 214B). For example, and as described above, some of the one or more trained models 108 may be trained on available conversation transcript data 104 to determine a bind probability for the conversation at any point in time of the conversation. In some embodiments, the neural network prediction models 108 may further be trained to identify one or more flag events, as described above. In some embodiments, the neural network prediction model 108 may be updated and refined as new training data sets become available.

In an embodiment, in block 302 of the process 300, the one or more processors 204 may receive text data of the conversation (e.g., transcribed conversation data 104) to which the predictive model is to be applied. For example, the transcribed conversation data 104 may be received, e.g., automatically, from the audio capture module 226. In some embodiments, transcribed conversation data 104 may be recorded and/or provided directly from a network-based textual communications (e.g., from a text-based conversation, an email conversation, or the like). In some embodiments, the transcribed conversation data 104 may be provided in real-time as the conversation is occurring to provide real time data analytics.

At block 304, the process 300 may include applying a padding function to each segment of the text data. Thus, conversations may be padded to become the same length through artificially padded turn values when input into the one or more models 108, as described herein. An applied loss function, as described in greater detail below, may ignore the artificially added padded turn values applied by the padding function when minimizing error. For example, machine-readable instructions, when executed by the one or more processors 204 may cause the intelligent prediction system 200 to apply the loss function to each segment (e.g., post vectorization). With respect to the padding function, and as described above, zeros may be added to each segment to ensure each segment is an equivalent character length, or the segments may be weight adjusted such that each segment has an equivalent weight. In some embodiments, segments may be subdivided into smaller segment fragments to ensure proper length and/or weight.

At block 304, the process 300 includes vectorizing each segment, or segment fragment, of the text data to assign an associated numerical value to each segment. Machine-readable instructions, when executed by the one or more processors 204, may cause the intelligent prediction system 200 to vectorize each segment to assign the associated numerical value to each segment. Post vectorization, the loss function of block 306 may be applied.

At block 308, the process 300 includes generating a segment bind probability for each segment of the text data based on the associated numerical value and memory. As a non-limiting example, some embodiments of the one or more models 108 may include a neural network prediction model configured to generate a point in time bind probability representative of a likelihood of a successful outcome of the sale offer at the point in time based on (i) a speaker turn segment bind probability of a speaker turn segment at the point in time and (ii) memory data (e.g., from the GRU) associated with the plurality of speaker turn segments up to the point in time. At block 312, the process 300 includes generating, via the neural network prediction model, a speaker turn segment impact score at the point in time by subtracting (e.g., in block 310) an immediately preceding point in time bind probability from the point in time bind probability. Accordingly, the machine-readable instructions, when executed by the one or more processors 204 may cause the intelligent prediction system 200 to generate the bind probability at any point in time of the conversation. For example, a starting bind probability may be set to zero, an average bind probability, or a starting bind probability based on customer information (e.g., purpose of call, credit history, current policies, etc.). Bind probability may thereafter fluctuate to indicate the bind probability throughout the conversation.

At block 314, the process 300 may include graphically displaying the point in time bind probability on the display 224. For example, the machine-readable instructions, when executed by the one or more processors 204, cause the intelligent prediction system 200 to provide a visual output of the point in time bind probability on the display 224. For example, the one or more processors 204 may, by executing machine-readable instructions, generate a point in time bind probability plot 400, illustrated in FIG. 4, to graphically display the point in time bind probability at each turn of the conversation, and display the point in time bind probability plot 400 on the display 224.

For example, FIG. 4 illustrates an exemplary bind probability plot 400 wherein bind probability (e.g., the Y-Axis) is plotted over time (e.g., the X-Axis). Time refers to the time elapsed in the conversation. The bind probability is plotted for each segment of the conversation to allow a user to readily understand the impact of each turn as either positively or negatively affecting the outcome. In the illustrated example, a starting bind probability 402 is set at approximately 0.35. That is, the starting bind probability 402 has been determined to be a 35% chance of a successful outcome (e.g., making a sale), prior to interaction with the customer. Thereafter, the customer takes the first turn 406 and indicates that she tried to buy renters insurance online. This increases the bind probability to about 58% chance of a successful outcome. Thereafter the bind probability fluctuates with each turn in the conversation, in this case, eventually increasing to indicate a 99.9% probability of a successful outcome.

Referring again to FIG. 3, the process 300 may include identifying one or more flag events, as described herein. For example, the intelligent prediction system 200 may be trained or otherwise configured to process (e.g., with the text analytics module 212) the text data to identify the one or more flag events. The one or more flag events may include, for example, asking for a sale, discussing a premium, a customer asking for a sale, offering a discount, a client objection, mentioning a competitor, mentioning specific product offerings, or the like. In some embodiments, the one or more flag events may correspond to a predetermined sale technique (e.g., offering a discount, bundling, etc.). In some embodiments, the process 300 may further include generating one or more markers associated with the one or more flag events and displaying the one or more markers on the bind probability plot. For example, and with reference to FIG. 4, the one or more markers (as depicted by legend 408) are depicted on the bind probability plot 400 at the moment in time of the conversation that the flag event occurred. Accordingly, a user may determine what flag event occurred, when the flag event occurred, and the impact it had on the conversation.

Figure 5:
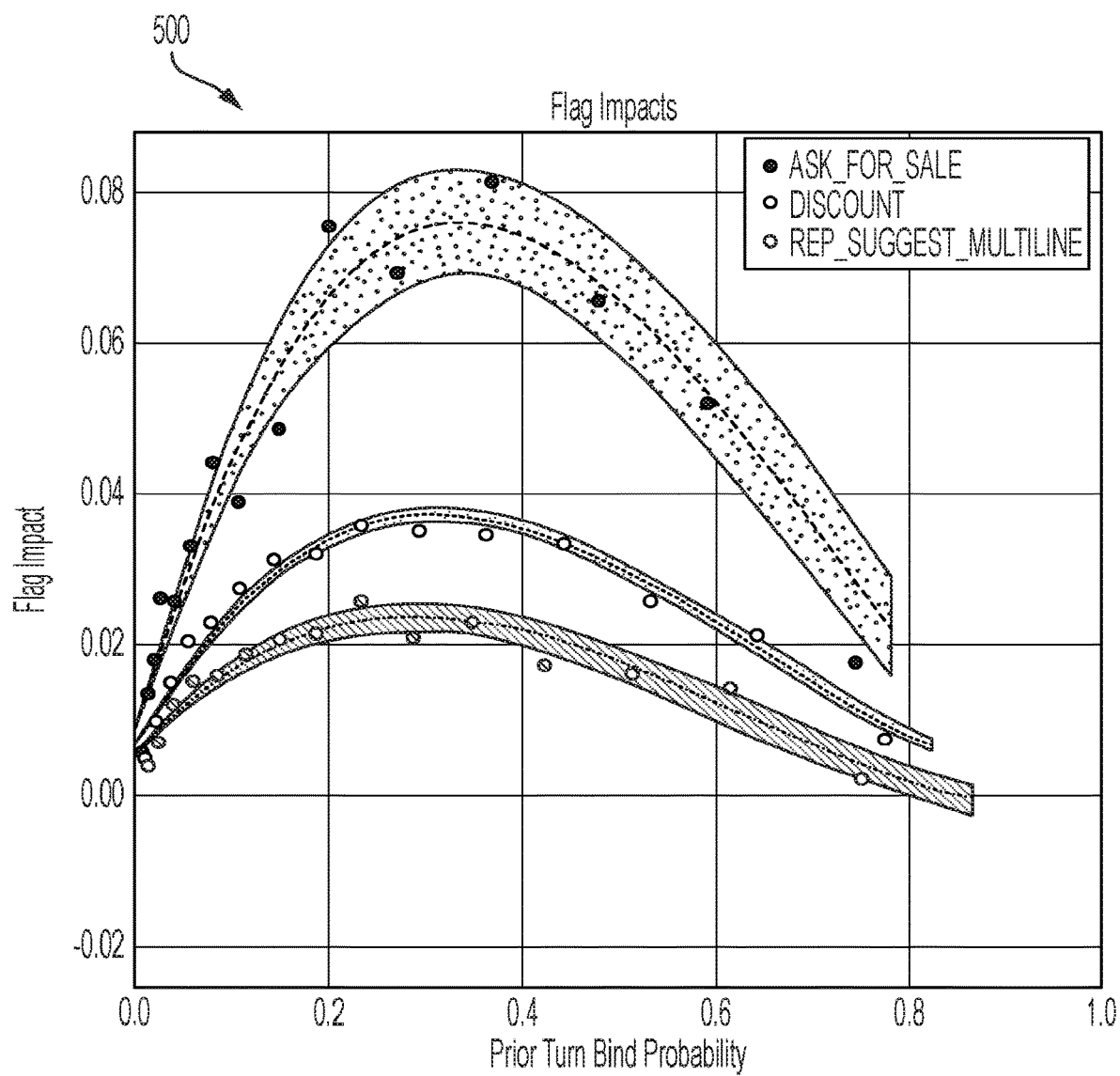
FIG. 5 graphically depicts an effect of different flag events based on prior turn bind probability, according to one or more embodiments shown and described herein.

In some embodiments, additional graphical representations may be generated by the intelligent prediction system 200. For example, machine-readable instructions executed by the one or more processors 204, may allow the intelligent prediction system 200 generate a plot illustrating the impact of one or more flag events depending on the prior turn bind probability. For example, FIG. 5 illustrates a flag event impact plot 500, illustrating the impact of a flag event including asking for a sale, offering a discount, and the representative suggesting a multi-line discount. The impact of each flag event (e.g., the Y-Axis) is plotted against the prior turn bind probability (X-Axis). Accordingly, it may be determined when a flag event may be most impactful. For example, there the prior turn bind probability is between about 20% and 50% one or more sale strategies (i.e., flag events, may have a particularly significant impact). For example, asking for a sale is most impactful when the prior turn bind probability is between about 20% and 40%.

Figure 6A:
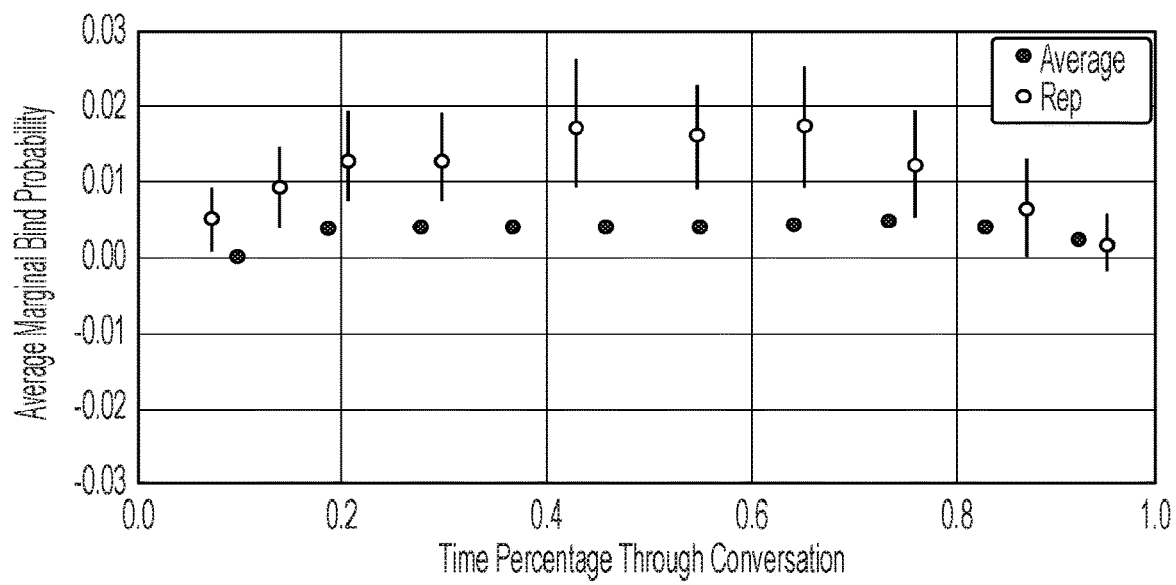
FIG. 6A graphically depicts an over-performing customer service representative as compared to average performance, according to one or more embodiments shown and described herein.
Figure 6B:
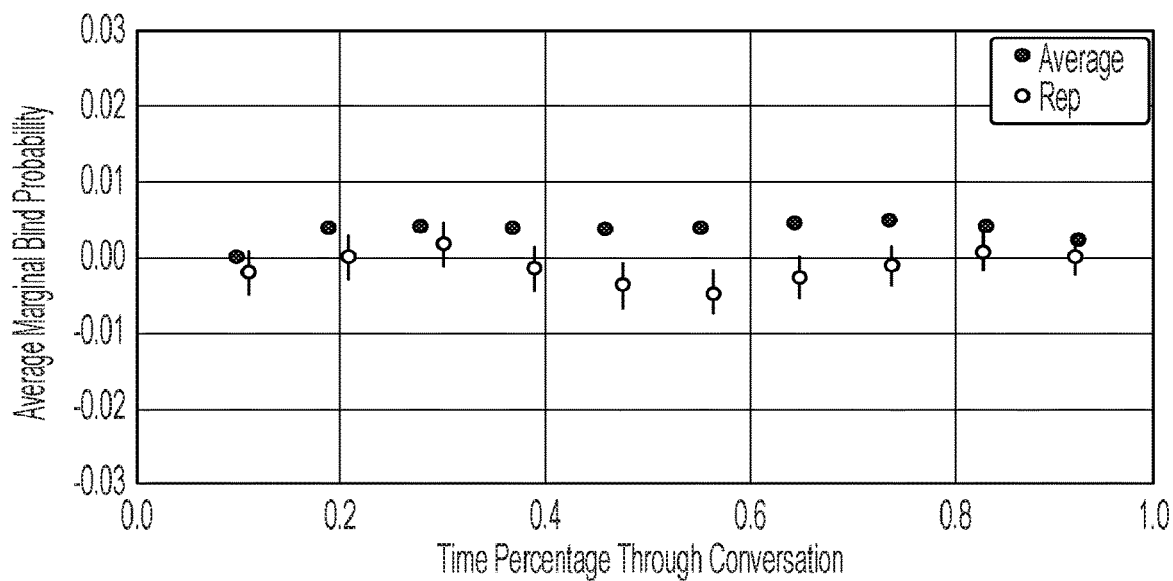
FIG. 6B graphically depicts an under-performing customer services representative as compared to average performance, according to one or more embodiments shown and described herein.

Referring now to FIGS. 6A and 6B, in some embodiments, analytics may be performed by the system 200 to determine customer service representative performance. For example, machine-readable instructions stored on the one or more memory modules, when executed by the one or more processors 204, may cause the intelligent prediction system 200 to determine an average bind probability based on one or more stored conversations, determine a performance metric (e.g., average participant bind probability) of a participant relative to the average bind probability, and compare the average bind probability to the performance metric of the participant. In embodiments, a set of performance metrics of the participant in the conversation may be determined, each performance metric of the participant determined based on a participant performance score in the conversation at each turn associated with the participant relative to the average bind probability. Further, a feedback performance metric for the participant may be generated based on the set of performance metrics, the average bind probability may be compared in a comparison to the feedback performance metrics of the participant in the conversation, and a positive participant performance score may be generated when the comparison is positive such that the feedback performance metrics is above the average bind probability.

As non-limiting examples, FIGS. 6A and 6B illustrate plots of a feedback performance metrics (e.g., a participant average bind probability) of a customer service representative through each point in a conversation compared to the average bind probability experienced across customer service representatives. This comparison allows users to determine if one or more customer service representatives are under-performing or over-performing compared to an average customer service representative. For example, FIG. 6A illustrates a performance of a customer service representative who is out-performing in terms of bind probability throughout a conversation, and thus would generate the positive participant score, while FIG. 6B illustrates a performance of a customer service representative who appears to be, on average, underperforming throughout a conversation. FIGS. 6A and 6B may be representative of the same customer service representative as a participant in different conversations. Alternatively, FIGS. 6A and 6B may be representative of different customer service representatives each as a participant in different respective conversations. Such information as provided through the scores and plots as described herein may allow users to determine training initiatives, rewards, and other manners in which to advance and award positive conversational outcomes.

It should now be understood that embodiments of the present disclosure are directed to intelligent prediction systems and methods configured to determine a bind probability, wherein the impact of each turn in the conversation is realized and taken into account to show the change in bind probability throughout the conversation. Accordingly, users may be able to determine impactful events that increase bind probability. For example, one or more flag events may be detected and a segment impact of the one or more flag events throughout a conversation may be determined. This may allow a user such as a sales representative to understand how a conversation is progressing and/or if particular strategies may be more likely to lead to successful results of the conversation (e.g., making a sale).

For the purposes of describing and defining the present disclosure, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" or "programmed" in a particular way, to embody a particular property, or to function in a particular manner, are structural recitations, as opposed to recitations of intended use.

It is noted that terms like "preferably," "commonly," and "typically," when utilized herein, are not utilized to limit the scope of the claimed disclosure or to imply that certain features are critical, essential, or even important to the structure or function of the claimed disclosure. Rather, these terms are merely intended to identify particular aspects of an embodiment of the present disclosure or to emphasize alternative or additional features that may or may not be utilized in a particular embodiment of the present disclosure.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It should now be understood that embodiments are directed to an intelligent prediction system that processes text data representative of a conversation between a customer service representative and a customer. The system is configured to generate a point in time bind probability representative of a likelihood of a successful outcome (e.g., a sale) at a point in time based on (i) a speaker turn segment bind probability of a speaker turn segment at the point in time and (ii) memory data associated with the plurality of speaker turn segments up to the point in time, and generate a speaker turn segment impact score at the point in time by subtracting an immediately preceding point in time bind probability from the point in time bind probability. Such information may allow a customer representative to determine an appropriate strategy, indicate an appropriate time to try a sale strategy, or the like. Moreover, such information may provide metrics for determining performance of a particular customer service representative and/or aid users in identifying potential training initiatives.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

It is noted that one or more of the following claims utilize the term "wherein" as a transitional phrase. For the purposes of defining the present disclosure, it is noted that this term is an open-ended transitional term that is used to introduce a recitation of a series of characteristics of the structure and should be interpreted in like manner as the more commonly used open-ended preamble term "comprising."

ASPECTS LISTING

Aspect 1. An intelligent prediction system for conversational outcome prediction includes one or more processors, one or more memory components communicatively coupled to the one or more processors, and machine-readable instructions stored in the one or more memory components. The machine-readable instructions cause the intelligent prediction system to perform at least the following when executed by the one or more processors: receive text data including a plurality of speaker turn segments of a transcription of a conversation between two or more individuals regarding a sale offer, each speaker turn segment of the plurality of speaker turn segments of the transcription representative of a turn in the conversation associated with speech data of one of the two or more individuals, the plurality of speaker turn segments collectively representative of the conversation up to a point of time; vectorize each speaker turn segment of the text data to assign an associated numerical value to each speaker turn segment; generate, via a neural network prediction model, a point in time bind probability representative of a likelihood of a successful outcome of the sale offer at the point in time based on (i) a speaker turn segment bind probability of a speaker turn segment at the point in time and (ii) memory data associated with the plurality of speaker turn segments up to the point in time; and generate, via the neural network prediction model, a speaker turn segment impact score at the point in time by subtracting an immediately preceding point in time bind probability from the point in time bind probability.

Aspect 2. The intelligent prediction system of Aspect 1, further including a display communicatively coupled to the one or more processors, wherein the machine-readable instructions further cause the intelligent prediction system to generate a point in time bind probability plot to graphically display the point in time bind probability at each turn of the conversation, and display the point in time bind probability plot on the display.

Aspect 3. The intelligent prediction system of any preceding Aspect, wherein the machine-readable instructions further cause the intelligent prediction system to: identify one or more flag events corresponding to a predetermined sale technique; and analyze each speaker turn segment to identify the one or more flag events corresponding to the predetermined sale technique.

Aspect 4. The intelligent prediction system of any preceding Aspect, further including a display communicatively coupled to the one or more processors, wherein the machine-readable instructions further cause the intelligent prediction system to: generate a point in time bind probability plot to graphically display the point in time bind probability at each turn of the conversation on the display; generate one or more markers associated with the one or more flag events that are identified at each turn in which the one or more flag events occurred; and provide a visual output on the display of the one or more markers on the point in time bind probability plot.

Aspect 5. The intelligent prediction system of any preceding Aspect, wherein the one or more flag events include at least one of: a customer service representative asking for a sale; a customer asking for a sale; and the customer service representative offering a discount.

Aspect 6. The intelligent prediction system of any preceding Aspect, wherein the machine-readable instructions further cause the intelligent prediction system to: receive, via an audio capture module, audio data of the conversation; transcribe the audio data of the conversation from the audio capture module into the text data for each speaker turn segment.

Aspect 7. The intelligent prediction system of any preceding Aspect, wherein the machine-readable instructions further cause the intelligent prediction system to: receive customer data from one or more customer information sources; determine a starting bind probability based on the customer data; and generate the point in time bind probability representative of the likelihood of the successful outcome of the sale offer at the point in time based on the starting bind probability.

Aspect 8. The intelligent prediction system of any preceding Aspect, wherein the machine-readable instructions further cause the intelligent prediction system to: determine an average bind probability based on one or more stored conversations; and determine a set of performance metrics of a participant in the conversation, each performance metric of the participant determined based on a participant performance score in the conversation at each turn associated with the participant relative to the average bind probability; generate a feedback performance metric for the participant based on the set of performance metrics; compare in a comparison the average bind probability to the feedback performance metric of the participant in the conversation; and generate a positive participant performance score when the comparison is positive such that the feedback performance metric is above the average bind probability.

Aspect 9. The intelligent prediction system of any preceding Aspect, wherein the machine-readable instructions further cause the intelligent prediction system to: apply a padding function to each speaker turn segment with the vectorization such that each speaker turn segment includes an equivalent segment length, wherein the padding function includes addition of zeros to adjust each speaker turn segment to the equivalent segment length.

Aspect 10. The intelligent prediction system of any preceding Aspect, wherein the machine-readable instructions further cause the intelligent prediction system to: apply a loss function to each speaker turn segment post vectorization such that each speaker turn segment includes a weight adjustment to achieve a weight adjustment value, wherein the loss function includes adjusting each speaker turn segment based on the weight adjustment to achieve the weight adjustment value.

Aspect 11. The intelligent prediction system of any preceding Aspect, wherein the machine-readable instructions further cause the intelligent prediction system to: train the neural network prediction model based on a plurality of data sets of pre-stored conversations, wherein the neural network prediction model is trained to generate the point in time bind probability for the conversation based on the plurality of data sets of pre-stored conversations.

Aspect 12. An intelligent prediction system for conversational outcome prediction includes one or more processors, one or more memory components communicatively coupled to the one or more processors, and machine-readable instructions stored in the one or more memory components. The machine-readable instructions cause the intelligent prediction system to perform at least the following when executed by the one or more processors: receive text data including a plurality of speaker turn segments of a transcription of a conversation between two or more individuals regarding a sale offer, each speaker turn segment of the plurality of speaker turn segments of the transcription representative of a turn in the conversation associated with speech data of one of the two or more individuals, the plurality of speaker turn segments collectively representative of the conversation up to a point of time; vectorize each speaker turn segment of the text data to assign an associated numerical value to each segment; apply a loss function configured to minimize error to each speaker turn segment post vectorization; generate, via a neural network prediction model, a point in time bind probability representative of a likelihood of a successful outcome of the sale offer at the point in time based on (i) a speaker turn segment bind probability of a speaker turn segment at the point in time and (ii) memory data associated with the plurality of speaker turn segments up to the point in time; and generate, via the neural network prediction model, a speaker turn segment impact score at the point in time by subtracting an immediately preceding point in time bind probability from the point in time bind probability.

Aspect 13. The intelligent prediction system of any preceding Aspect, wherein the machine-readable instructions further cause the intelligent prediction system to: apply a padding function to each speaker turn segment with the vectorization such that each speaker turn segment includes an equivalent segment length, wherein the padding function includes addition of zeros to adjust each speaker turn segment to the equivalent segment length.

Aspect 14. The intelligent prediction system of any preceding Aspect, wherein the machine-readable instructions further cause the intelligent prediction system to: apply the loss function to each speaker turn segment post vectorization such that each speaker turn segment includes a weight adjustment to achieve a weight adjustment value, wherein the loss function includes adjusting each speaker turn segment based on the weight adjustment to achieve the weight adjustment value.

Aspect 15. The intelligent prediction system of any preceding Aspect, wherein the machine-readable instructions further cause the intelligent prediction system to: train the neural network prediction model based on a plurality of data sets of pre-stored conversations, wherein the neural network prediction model is trained to generate the point in time bind probability for the conversation based on the plurality of data sets of pre-stored conversations.

Aspect 16. A method of conversational outcome prediction using an intelligent prediction system includes: receiving, with one or more processors of the intelligent prediction system, text data including a plurality of speaker turn segments of a transcription of a conversation between two or more individuals regarding a sale offer, each speaker turn segment of the plurality of speaker turn segments of the transcription representative of a turn in the conversation associated with speech data of one of the two or more individuals, the plurality of speaker turn segments collectively representative of the conversation up to a point of time; vectorizing, with the one or more processors, each speaker turn segment of the text data to assign an associated numerical value to each speaker turn segment; generating, via a neural network prediction model, a point in time bind probability representative of a likelihood of a successful outcome of the sale offer at the point in time based on (i) a speaker turn segment bind probability of a speaker turn segment at the point in time and (ii) memory data associated with the plurality of speaker turn segments up to the point in time; and generating, via the neural network prediction model, a speaker turn segment impact score at the point in time by subtracting an immediately preceding point in time bind probability from the point in time bind probability.

Aspect 17. The method of any preceding Aspect, further including generating a point in time bind probability plot to graphically display the point in time bind probability at each turn of the conversation on a display; and displaying the point in time bind probability plot on the display.

Aspect 18. The method of any preceding Aspect, further including applying a padding function to each speaker turn segment with the vectorization such that each speaker turn segment includes an equivalent segment length, wherein the padding function includes addition of zeros to adjust each speaker turn segment to the equivalent segment length.

Aspect 19. The method of any preceding Aspect, further including applying a loss function to each speaker turn segment post vectorization such that each speaker turn segment includes a weight adjustment to achieve a weight adjustment value, wherein the loss function includes adjusting each speaker turn segment based on the weight adjustment to achieve the weight adjustment value.

Aspect 20. The method of any preceding Aspect, further including training the neural network prediction model based on a plurality of data sets of pre-stored conversations, wherein the neural network prediction model is trained to generate the point in time bind probability for the conversation based on the plurality of data sets of pre-stored conversations.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. An intelligent prediction system for conversational outcome prediction, comprising:
   one or more processors;
   one or more memory components communicatively coupled to the one or more processors; and
   machine-readable instructions stored in the one or more memory components that cause the intelligent prediction system to perform at least the following when executed by the one or more processors:
   receive text data comprising a plurality of speaker turn segments of a transcription of a conversation between two or more individuals, each speaker turn segment of the plurality of speaker turn segments of the transcription representative of a turn in the conversation associated with speech data of one of the two or more individuals, the plurality of speaker turn segments collectively representative of the conversation up to a point of time;
   vectorize each speaker turn segment of the text data to assign an associated numerical value to each speaker turn segment;
   generate, via a neural network prediction model, a point in time bind probability representative of a likelihood of a successful outcome at the point in time based on (i) a speaker turn segment bind probability of a speaker turn segment at the point in time and (ii) memory data associated with the plurality of speaker turn segments up to the point in time;
   generate, via the neural network prediction model, a speaker turn segment impact score at the point in time by subtracting an immediately preceding point in time bind probability from the point in time bind probability; and
   train the neural network prediction model based on a plurality of data sets of pre-stored conversations, wherein the neural network prediction model is updated and refined as new conversations become available to identify patterns indicative of increasing and decreasing bind probabilities.

2. The intelligent prediction system of claim 1, further comprising:
   a display communicatively coupled to the one or more processors;
   wherein the machine-readable instructions further cause the intelligent prediction system to
   generate a point in time bind probability plot to graphically display the point in time bind probability at each turn of the conversation, and
   display the point in time bind probability plot on the display.

3. The intelligent prediction system of claim 1, wherein the machine-readable instructions further cause the intelligent prediction system to:
   identify one or more flag events corresponding to a predetermined sale technique; and
   analyze each speaker turn segment to identify the one or more flag events corresponding to the predetermined sale technique.

4. The intelligent prediction system of claim 3, further comprising:
   a display communicatively coupled to the one or more processors, wherein the machine-readable instructions further cause the intelligent prediction system to:
   generate a point in time bind probability plot to graphically display the point in time bind probability at each turn of the conversation on the display;
   generate one or more markers associated with the one or more flag events that are identified at each turn in which the one or more flag events occurred; and
   provide a visual output on the display of the one or more markers on the point in time bind probability plot.

5. The intelligent prediction system of claim 3, wherein the one or more flag events comprise at least one of:
   a customer service representative asking for a sale;
   a customer asking for a sale; and
   the customer service representative offering a discount.

6. The intelligent prediction system of claim 1, wherein the machine-readable instructions further cause the intelligent prediction system to:
   receive customer data from one or more customer information sources;
   determine a starting bind probability based on the customer data; and
   generate the point in time bind probability representative of the likelihood of the successful outcome at the point in time based on the starting bind probability.

7. The intelligent prediction system of claim 1, wherein the machine-readable instructions further cause the intelligent prediction system to:
   determine an average bind probability based on one or more stored conversations; and
   determine a set of performance metrics of a participant in the conversation, each performance metric of the participant determined based on a participant performance score in the conversation at each turn associated with the participant relative to the average bind probability;
   generate a feedback performance metric for the participant based on the set of performance metrics;
   compare in a comparison the average bind probability to the feedback performance metric of the participant in the conversation; and
   generate a positive participant performance score when the comparison is positive such that the feedback performance metric is above the average bind probability.

8. The intelligent prediction system of claim 1, wherein the machine-readable instructions further cause the intelligent prediction system to:
   apply a padding function to each speaker turn segment with the vectorization such that each speaker turn segment comprises an equivalent segment length, wherein the padding function comprises addition of zeros to adjust each speaker turn segment to the equivalent segment length.

9. The intelligent prediction system of claim 1, wherein the machine-readable instructions further cause the intelligent prediction system to:
apply a loss function to each speaker turn segment after vectorization such that each speaker turn segment comprises a weight adjustment to achieve a weight adjustment value, wherein the loss function comprises adjusting each speaker turn segment based on the weight adjustment to achieve the weight adjustment value.

10. An intelligent prediction system for conversational outcome prediction, comprising:
one or more processors;
one or more memory components communicatively coupled to the one or more processors; and
machine-readable instructions stored in the one or more memory components that cause the intelligent prediction system to perform at least the following when executed by the one or more processors:
receive, via an audio capture module, audio data of a conversation;
transcribe the audio data of the conversation from the audio capture module into text data comprising a plurality of speaker turn segments of the conversation between two or more individuals, each speaker turn segment of the plurality of speaker turn segments of the transcription representative of a turn in the conversation associated with speech data of one of the two or more individuals, the plurality of speaker turn segments collectively representative of the conversation up to a point of time;
vectorize each speaker turn segment of the text data to assign an associated numerical value to each segment;
generate, via a neural network prediction model, a point in time bind probability representative of a likelihood of a successful outcome at the point in time based on (i) a speaker turn segment bind probability of a speaker turn segment at the point in time and (ii) memory data associated with the plurality of speaker turn segments up to the point in time;
generate, via the neural network prediction model, a speaker turn segment impact score at the point in time by subtracting an immediately preceding point in time bind probability from the point in time bind probability; and
train the neural network prediction model based on a plurality of data sets of pre-stored conversations, wherein the neural network prediction model is updated and refined as new conversations become available to identify patterns indicative of increasing and decreasing bind probabilities.

11. The intelligent prediction system of claim 10, wherein the machine-readable instructions further cause the intelligent prediction system to:
apply a padding function to each speaker turn segment with the vectorization such that each speaker turn segment comprises an equivalent segment length, wherein the padding function comprises addition of zeros to adjust each speaker turn segment to the equivalent segment length.

12. The intelligent prediction system of claim 10, wherein the machine-readable instructions further cause the intelligent prediction system to:
apply a loss function to each speaker turn segment after vectorization such that each speaker turn segment comprises a weight adjustment to achieve a weight adjustment value, wherein the loss function comprises adjusting each speaker turn segment based on the weight adjustment to achieve the weight adjustment value.

13. A method of conversational outcome prediction using an intelligent prediction system, the method comprising:
receiving, with one or more processors of the intelligent prediction system, text data comprising a plurality of speaker turn segments of a transcription of a conversation between two or more individuals, each speaker turn segment of the plurality of speaker turn segments of the transcription representative of a turn in the conversation associated with speech data of one of the two or more individuals, the plurality of speaker turn segments collectively representative of the conversation up to a point of time;
vectorizing, with the one or more processors, each speaker turn segment of the text data to assign an associated numerical value to each speaker turn segment;
generating, via a neural network prediction model, a point in time bind probability representative of a likelihood of a successful outcome at the point in time based on (i) a speaker turn segment bind probability of a speaker turn segment at the point in time and (ii) memory data associated with the plurality of speaker turn segments up to the point in time; and
generating, via the neural network prediction model, a speaker turn segment impact score at the point in time by subtracting an immediately preceding point in time bind probability from the point in time bind probability; and
training the neural network prediction model based on a plurality of data sets of pre-stored conversations, wherein the neural network prediction model is updated and refined as new conversations become available to identify patterns indicative of increasing and decreasing bind probabilities.

14. The method of claim 13, further comprising:
generating a point in time bind probability plot to graphically display the point in time bind probability at each turn of the conversation on a display; and
displaying the point in time bind probability plot on the display.

15. The method of claim 13, further comprising:
applying a padding function to each speaker turn segment with the vectorization such that each speaker turn segment comprises an equivalent segment length, wherein the padding function comprises addition of zeros to adjust each speaker turn segment to the equivalent segment length.

16. The method of claim 13, further comprising:
applying a loss function to each speaker turn segment after vectorization such that each speaker turn segment comprises a weight adjustment to achieve a weight adjustment value, wherein the loss function comprises adjusting each speaker turn segment based on the weight adjustment to achieve the weight adjustment value.

* * * * *